(12) United States Patent
Saini et al.

(10) Patent No.: US 8,770,279 B2
(45) Date of Patent: Jul. 8, 2014

(54) NANOHYBRID PHASE INTERFACES FOR FOAMING IN OIL FIELD APPLICATIONS

(75) Inventors: Rajesh Kumar Saini, Cypress, TX (US); Lewis R Norman, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/364,900

(22) Filed: Feb. 2, 2012

(65) Prior Publication Data

US 2012/0181033 A1 Jul. 19, 2012

Related U.S. Application Data

(63) Continuation-in-part of application No. 13/005,861, filed on Jan. 13, 2011.

(51) Int. Cl.
*E21B 43/16* (2006.01)
*E21B 47/00* (2012.01)
*E21B 43/25* (2006.01)

(52) U.S. Cl.
USPC ........ 166/228; 166/278; 166/305; 166/305.1; 166/308; 166/275; 166/252; 166/401

(58) Field of Classification Search
USPC ......................................... 166/572, 268, 202
See application file for complete search history.

(56) References Cited

U.S. PATENT DOCUMENTS

| | | | |
|---|---|---|---|
| 3,980,136 A | 9/1976 | Plummer et al. | |
| 5,304,620 A | 4/1994 | Holtmyer et al. | |
| 5,855,243 A * | 1/1999 | Bragg ........................... | 166/275 |
| 5,910,467 A * | 6/1999 | Bragg ........................... | 507/202 |
| 2003/0220204 A1 | 11/2003 | Baran, Jr. et al. | |
| 2005/0016726 A1* | 1/2005 | Nguyen et al. ................ | 166/278 |
| 2009/0211758 A1* | 8/2009 | Bragg et al. .................. | 166/275 |
| 2009/0298720 A1 | 12/2009 | Nguyen et al. | |
| 2009/0325826 A1 | 12/2009 | Quintero et al. | |
| 2011/0036582 A1* | 2/2011 | Ladva et al. ............... | 166/308.1 |
| 2011/0312857 A1 | 12/2011 | Amanullah et al. | |

FOREIGN PATENT DOCUMENTS

WO WO2011088556 A1 7/2011

OTHER PUBLICATIONS

Elmkies, "Further Investigations on Two-Phase Flow Property Modifications by Polymers: Wettability Effects", Society of Petroleum Engineers 64986, Feb. 13-16, 2001.
Gaydos, "Foam Fracturing: Theories, Procedures and Results", Society of Petroleum Engineers 8961, May 18-21, 1980.
Tang, "Relative Permeability Modification in Gas-Liquid Systems Through Wettability Alteration to Intermediate Gas-Wetting", Society of Petroleum Engineers 62934, Oct. 1-4, 2000.
Eder, "Carbon Nanotube—Inorganic Hybrids", Department of Science and Metallurgy, University of Cambridge, Jul. 15, 2008.
Qingjie, "Improvement of Flow Performance through Wettability Modification for Extra-Low Permeability Reservoirs", Society of Petroleum Engineers 131895, Jun. 8-10, 2010.
Al-Garni, "Investigation of Wettability Effects on Capillary Pressure, and Irreducible Saturation for Saudi Crude Oils, Using Rock Centrifuge", Oil and Gas Business, 2008.
Sanchez, "Applications of Hybrid Organic-Inorganic Nanocomposites", Journal of Materials Chemistry, Jun. 27, 2005.
Zelazowska, "Organic-Inorganic Hybrid Materials Doped with Lithium Ions", Optica Applicata, vol. XXXVIII, No. 1, Sep. 27, 2007.
Zelazowska, "Hybrid Materials Doped with Lithium Ions", Optica Applicata, vol. XL, No. 2, Nov. 12, 2009.
Shen and Resasco, Emulsions Stabilized by Carbon Nanotube-Silica Nanohybrids, American Chemical Society, May 23, 2009.
Shen, Min and Resasco, Daniel E., Emulsions Stabilized by Carbon Nanotube-Silica Nanohybrids, 2009 American Chemical Society, Jun. 17.
International Search Report and the Written Opinion, PCT/US2013/023652, Date of Mailing Jun. 21, 2013.
Luis Villamizar, Prapas Lohateeraparp, Jeffrey Harwell, Damiel Resasco, Ben Shiau, "Interfacially Active SWNT/Silica Nanohybrid Used in Enhanced Oil Recovery," SPE 129901, 2010 SPE Improved Oil Recovery Symposium, Tulsa, Oklahoma, USA, Apr. 26-28, 2010, 11 pages.
A.R. Baron et al., "Big Things in Small Packages," Oilfield Review, vol. 22, No. 3, Dec. 31, 2010, pp. 38-49.
Written Opinion, PCT/GB2012/000020, Jul. 25, 2013, 7 pages.

* cited by examiner

*Primary Examiner* — Zakiya W Bates
*Assistant Examiner* — Silvana Runyan
(74) *Attorney, Agent, or Firm* — Craig Roddy; Booth Albanesi Schroeder LLC

(57) ABSTRACT

Methods of using nanohybrid-containing fluids in a well are provided. The methods include the steps of: (a) forming or providing a well fluid comprising a nanohybrid; and (b) introducing the well fluid into a well. The methods can be used in various applications, such as in drilling, completion, or intervention operations.

12 Claims, No Drawings

NANOHYBRID PHASE INTERFACES FOR FOAMING IN OIL FIELD APPLICATIONS

CROSS-REFERENCE TO RELATED APPLICATIONS

This application is a continuation-in-part of U.S. application Ser. No. 13/005,861 filed Jan. 13, 2011 entitled Nanohybrid-Stabilized Emulsions and Methods of Use in Oil Field Applications.

BACKGROUND

1. Technical Field

The inventions generally relate to the field of producing crude oil or natural gas from a well. More particularly, the inventions are directed to improved well fluids and methods for use in wells.

2. Background Art

Producing Oil & Gas

In the context of production from a well, oil (in this context referring to crude oil) and gas (in this context referring to natural gas) are well understood to refer to hydrocarbons naturally occurring in certain subterranean formations. A hydrocarbon is a naturally occurring organic compound comprising hydrogen and carbon, which can be as simple as methane ($CH_4$) or can be a highly complex molecule or anything in between. Petroleum is a complex mixture of hydrocarbons. Oil wells usually produce oil and gas along with water.

A subterranean formation containing oil or gas is sometimes referred to as a reservoir. A reservoir is in a shape that will trap hydrocarbons and that is covered by a relatively impermeable rock, known as cap rock. The cap rock forms a barrier or seal above and around reservoir rock so that fluids cannot migrate beyond the reservoir. Cap rock is commonly shale, anhydrite, or salt. In addition, gas shows from shales during drilling have led some shales to be targeted as gas reservoirs. A reservoir may be located under land or under the seabed off shore. Oil and gas reservoirs are typically located in the range of a few hundred feet (shallow reservoirs) to a few tens of thousands of feet (ultra-deep reservoirs) below the surface of the land or seabed.

As used herein, "subterranean formation" refers to the fundamental unit of lithostratigraphy. A subterranean formation is a body of rock that is sufficiently distinctive and continuous that it can be mapped. In the context of formation evaluation, the term refers to the volume of rock seen by a measurement made through the wellbore, as in a log or a well test. These measurements indicate the physical properties of this volume of rock, such as the property of permeability. A "zone" refers to an interval or unit of rock along a wellbore that is differentiated from surrounding rocks based on hydrocarbon content or other features, such as faults or fractures.

To produce oil or gas from a reservoir, a wellbore is drilled into a subterranean formation, which may be the reservoir or adjacent to the reservoir. The "wellbore" refers to the drilled hole, including a cased or uncased portion of the well. As used herein, the "borehole" refers to the inside wellbore wall, that is, the rock face or wall that bounds the drilled hole. A wellbore can have portions that are vertical and horizontal, and it can have portions that are straight, curved, or branched. The wellhead is the surface termination of a wellbore, which surface may be on land or on a seabed. As used herein, "uphole" and "downhole" and similar terms are relative to the wellhead, regardless of whether a wellbore portion is vertical or horizontal.

As used herein, a "well" includes at least one wellbore. A "well" can include a near-wellbore region of a subterranean formation surrounding a portion of a wellbore that is in fluid communication with the wellbore. As used herein, "into a well" means at least through the wellhead. It can include into any downhole portion of the wellbore and it can include through the wellbore and into a near-wellbore region.

Generally, well services include a wide variety of operations that may be performed in oil, gas, geothermal, or water wells, such as drilling, cementing, completion, and intervention operations. These well services are designed to facilitate or enhance the production of desirable fluids from or through a subterranean formation.

As used herein, a "well fluid" broadly refers to any fluid adapted to be introduced into a well for any well-servicing purpose. A "well fluid" can be, for example, a drilling fluid, a cementing fluid, a treatment fluid, or a spacer fluid. If a well fluid is to be used in a relatively small volume, for example less than about 200 barrels, it is sometimes referred to in the art as a slug or a pill. Accordingly, as used herein a "well fluid" can be a slug or a pill.

Drilling and Drilling Fluids

Drilling is the process of drilling the wellbore. The well is created by drilling a hole, usually about 5 inches (13 cm) to about 36 inches (91 cm) in diameter into the earth (or seabed) with a drilling rig that rotates a drill string with a bit attached. After the hole is drilled, sections of steel pipe, known as casing, which are slightly smaller in diameter than the borehole, are placed in at least the uppermost portions of the borehole. The casing provides structural integrity to the newly drilled wellbore, in addition to isolating potentially dangerous high pressure zones from each other and from the surface.

While drilling an oil or gas well, a drilling fluid is circulated downhole through a drillpipe to a drill bit at the downhole end, out through the drill bit into the wellbore, and then back uphole to the surface through the annular path between the tubular drillpipe and the borehole. The purpose of the drilling fluid is to maintain hydrostatic pressure in the wellbore, to lubricate the drill string, and to carry rock cuttings out from the wellbore.

A drilling fluid can be water-based or oil-based. Oil-based fluids tend to have better lubricating properties than water-based fluids, nevertheless, other factors can mitigate in favor of using a water-based drilling fluid.

In addition, the drilling fluid may be viscosified to help suspend and carry rock cuttings out from the wellbore. Rock cuttings can range in size from fines to chunks measured in centimeters. Carrying capacity is the ability of a circulating drilling fluid to transport rock fragments out of a wellbore. Carrying capacity is an essential function of a drilling fluid, synonymous with hole-cleaning capacity and cuttings lifting. Carrying capacity is determined principally by the annular velocity, hole angle, and flow profile of the drilling fluid, but is also affected by mud weight, cuttings size, and pipe position and movement.

The wellbore may pass through zones that produce water instead of hydrocarbons. Besides being highly undesirable during the production phase, water-producing zones can cause problems in the wellbore with certain drilling and completion activities and associated fluids. For example, the water production may highly dilute the drilling or other treatment fluid in the well. If possible, however, water production is generally ignored during the drilling phase.

Cementing and Hydraulic Cement Compositions

Cementing is a common well operation. For example, hydraulic cement compositions can be used in primary cementing operations during completion in which a string of pipe, such as casing or liner, is cemented in a wellbore. In performing primary cementing, a hydraulic cement composition is pumped as a fluid (typically a suspension or slurry) into the annular space between the exterior surfaces of a pipe string and the borehole (that is, the wall of the wellbore). The cement composition is allowed time to set in the annular space, thereby forming an annular sheath of hardened, substantially impermeable cement. The hardened cement supports and positions the pipe string in the wellbore and bonds the exterior surfaces of the pipe string to the walls of the wellbore. Hydraulic cement compositions can also be utilized in remedial cementing operations, such as in plugging highly permeable zones or fractures in near-wellbore regions, plugging cracks or holes in pipe strings, and the like.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

Well Treatments and Treatment Fluids

Completion is the process of making a well ready for production or injection. This principally involves preparing the bottom of the hole to the required specifications, running in the production tubing and associated downhole tools, as well as perforating and stimulating as required.

Well intervention, or "well work," is any operation carried out on a well during or at the end of its productive life that alters the state of the well or well geometry, provides well diagnostics, or manages the production of the well. Workover can broadly refer to any kind of well intervention involving invasive techniques, such as wireline, coiled tubing, or snubbing. More specifically, though, it refers to the process of pulling and replacing a completion.

Drilling, completion, and intervention operations can include various types of treatments that are commonly performed on a well or subterranean formation. For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

As used herein, the word "treatment" refers to any treatment for changing a condition of a wellbore or an adjacent subterranean formation. Examples of treatments include fluid-loss control, isolation, stimulation, or conformance control; however, the word "treatment" does not necessarily imply any particular treatment purpose.

A treatment usually involves introducing a treatment fluid into a well. As used herein, a "treatment fluid" is a fluid used in a treatment. The word "treatment" in the term "treatment fluid" does not necessarily imply any particular action by the fluid. If a treatment fluid is to be used in a relatively small volume, for example less than about 200 barrels, it is sometimes referred to in the art as a slug or a pill. Accordingly, as used herein the term "treatment fluid" can be a slug or a pill.

The following are some examples and general descriptions of common well treatments and associated treatment fluids. Of course, other well treatments and treatment fluids are known in the art.

Well Treatment—Fluid-Loss Control

"Fluid loss" refers to the undesirable leakage of the liquid phase of a well fluid that contains solid particles into the matrix of a subterranean formation surrounding a portion of the wellbore. The resulting buildup of solid particulate material on the walls of the wellbore is referred to as a filter cake. Depending on the particulate material and the liquid phase, such a filtercake may help block the further loss of the liquid phase (referred to as a filtrate) into the subterranean formation. Providing effective fluid-loss control for well fluids is usually highly desirable.

Fluid-loss control materials are additives specifically designed to lower the volume of a filtrate that passes through a filter medium. Most attain their fluid-loss control from the presence of solvent-specific solids, or from hydrated linear polymers that rely on filter cake buildup and on viscoelasticity to inhibit fluid flow into and through the formation. A variety of fluid-loss control materials have been used and evaluated, including foams, oil-soluble resins, acid-soluble particulates, graded salt slurries, linear viscoelastic polymers, and heavy metal-crosslinked polymers. Their respective comparative effects are well documented. Fluid-loss control materials are sometimes used in drilling fluids or treatment fluids.

Other techniques that have been developed to control fluid loss include the use of "fluid-loss control pills," which sometimes are referred to as "lost circulation pills." A "fluid-loss control pill" is a treatment fluid that is designed or used to provide some degree of fluid-loss control. Through a combination of viscosity, solids bridging, and cake buildup on the porous rock, these pills oftentimes are able to substantially seal off portions of the formation from fluid loss. They also generally enhance filter-cake buildup on the face of the formation to inhibit fluid flow into the formation from the wellbore.

Fluid-loss control pills typically comprise an aqueous base fluid and a high concentration of a gelling agent polymer (usually crosslinked), and sometimes, bridging particles, like graded sand, potassium salts, or sized calcium carbonate particles. The most commonly used fluid-loss control pills contain high concentrations (100 to 150 lbs/1000 gal) of derivatized hydroxyethylcellulose ("HEC"). HEC is generally accepted as a gelling agent affording minimal permeability damage during completion operations. Normally, HEC polymer solutions do not form rigid gels, but control fluid loss by a viscosity-regulated or filtration mechanism. Some other gelling agent polymers that have been used include guar, guar derivatives, carboxymethylhydroxyethylcellulose ("CM-HEC"), and even starch.

As an alternative to forming linear polymeric gels for fluid-loss control, crosslinked gels often are used. Crosslinking the gelling agent polymer creates a gel structure that can support solids as well as provide fluid-loss control. Further, crosslinked fluid-loss control pills have demonstrated that they require relatively limited invasion of the formation face to be fully effective. To crosslink the gelling agent polymers, a suitable crosslinking agent that comprises polyvalent metal ions is used. Boron, aluminum, titanium, and zirconium are common examples.

A preferred crosslinkable gelling agent for fluid-loss control pills are graft copolymers of a hydroxyalkyl cellulose, guar, or hydroxypropyl guar that are prepared by a redox reaction with vinyl phosphonic acid. The gel is formed by hydrating the graft copolymer in an aqueous solution containing at least a trace amount of at least one divalent cation. The gel is crosslinked by the addition of a Lewis base or Bronsted-Lowrey base so that pH of the aqueous solution is adjusted from slightly acidic to slightly basic. Preferably, the chosen base is substantially free of polyvalent metal ions. The resulting crosslinked gel demonstrates shear-thinning and rehealing properties that provide relatively easy pumping, while the rehealed gel provides good fluid-loss control upon placement. This gel can be broken by reducing the pH of the fluid. Some fluid-loss pills of this type are described in U.S. Pat. No. 5,304,620, assigned to Halliburton Energy Services, the relevant disclosure of which is incorporated herein by reference. Fluid-loss control pills of this type are commercially available under the trade name "K-MAX" from Halliburton Energy Services Inc. in Duncan, Okla.

After their application, fluid-loss control pills can cause damage to the permeability of near-wellbore areas due to polymer filtration or filter-cake formation. To produce oil or gas from a subterranean formation, the filter cake resulting from a fluid-loss control pill must be removed to restore the formation's permeability, preferably to at least its original level. If the formation permeability is not restored to at least its original level, production levels from the formation can be significantly lower.

Well Treatment—Acidizing

A widely used stimulation technique is acidizing, in which a treatment fluid including an aqueous acid solution is introduced into the formation to dissolve acid-soluble materials that clog or constrict formation channels. In this way, hydrocarbon fluids can more easily flow from the formation into the well. In addition, an acid treatment can facilitate the flow of injected treatment fluids from the well into the formation.

Acidizing techniques can be carried out as "matrix acidizing" procedures or as "acid fracturing" procedures.

In matrix acidizing, the acidizing fluid is injected from the well into the formation at a rate and pressure below the pressure sufficient to create a fracture in the formation. The acid permeates into channels and dissolves materials that clog or constrict the channels, thereby increasing permeability of the formation. Thus, an increase in permeability is affected primarily by the reaction of the acid within the formation, and little or no permeability increase is due to induced fractures within the formation.

In acid fracturing, an increase in permeability is affected by fractures as well as by the acid etching through the channels within the formation. The acidic fracturing fluid is injected into the well that is disposed within the formation to be fractured. Sufficient pressure is applied to the acidizing treatment fluid to cause production of one or more fractures in the formation.

Well Treatment—Hydraulic Fracturing and Proppant

"Hydraulic fracturing," sometimes simply referred to as "fracturing," is a common stimulation treatment. A treatment fluid adapted for this purpose is sometimes referred to as a "fracturing fluid." The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

A "frac pump" is used for hydraulic fracturing. A frac pump is a high-pressure, high-volume pump. Typically, a frac pump is a positive-displacement reciprocating pump. The structure of such a pump is resistant to the effects of pumping abrasive fluids, and the pump is constructed of materials that are resistant to the effects of pumping corrosive fluids. Abrasive fluids include hard, insoluble particulates, such as sand, and corrosive fluids include, for example, acids. The fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, flow rates in excess of 100 barrels per minute and pressures in excess of 10,000 psi are often encountered.

To fracture a subterranean formation typically requires hundreds of thousands of gallons of fracturing fluid. Further, it is often desirable to fracture at more than one downhole location of a well. Thus, a high volume of fracturing fluid is usually required to treat a well, which means that a low-cost fracturing fluid is desirable. Because of the ready availability and relative low cost of water compared to other liquids, a fracturing fluid is usually water-based.

The formation or extension of a fracture in hydraulic fracturing may initially occur suddenly. When this happens, the fracturing fluid suddenly has a fluid flow path through the fracture to flow more rapidly away from the wellbore. As soon as the fracture is created or enhanced, the sudden increase in the flow of fluid away from the well reduces the pressure in the well. Thus, the creation or enhancement of a fracture in the formation may be indicated by a sudden drop in fluid pressure, which can be observed at the wellhead. After initially breaking down the formation, the fracture may then propagate more slowly, at the same pressure or with little pressure increase.

A newly-created or extended fracture will tend to close together after the pumping of the fracturing fluid is stopped. To prevent the fracture from closing, a material must be placed in the fracture to keep the fracture propped open. A material used for this purpose is referred to as a "proppant."

The proppant is in the form of a solid particulate, which can be suspended in the fracturing fluid, carried downhole, and deposited in the fracture as a "proppant pack." The proppant pack props the fracture in an open condition while allowing fluid flow through the permeability of the pack. A particulate for use as a proppant is selected based on the characteristics of size range, crush strength, and insolubility.

The proppant is an appropriate size to prop open the fracture and allow fluid to flow through the proppant pack, that is, in between and around the proppant making up the pack. Appropriate sizes of particulate for use as a proppant are typically in the range from about 8 to about 100 U.S. Standard Mesh. A typical proppant is sand sized, which geologically is defined as having a largest dimension ranging from 0.0625 millimeters up to 2 millimeters (mm). (The next smaller particle size class below sand sized is silt, which is defined as having a largest dimension ranging from less than 0.0625 mm down to 0.004 mm.) Preferably, the proppant has a particulate size distribution range such that at least 90% of the proppant has a size of 0.0625 mm to 1.0 mm. For this purpose, "proppant" does not mean or refer to suspended solids, silt, fines, or other types of insoluble particulate smaller than 0.0625 mm. Further, it does not mean or refer to particulates larger than 2 mm.

The proppant is sufficiently strong, that is, has a sufficient compressive or crush resistance, to prop the fracture open without being deformed or crushed by the closure stress of the fracture in the subterranean formation. For a proppant material that crushes under closure stress, the proppant preferably has an API crush strength of at least 4,000 psi closure stress based on 10% crush fines for 20/40 mesh proppant or 16% crush fines for 12/20 mesh proppant according to procedure API RP-56. This performance is that of a medium crush-strength proppant, whereas a very high crush-strength proppant would be 10,000 psi. The higher the closing pressure of the formation of the fracturing application, the higher the strength of proppant is needed.

Further, a suitable proppant should not dissolve in fluids commonly encountered in a well environment. Preferably, a material is selected that will not dissolve in water or crude oil.

Suitable proppant materials include, but are not limited to, sand (silica), ground nut shells or fruit pits, sintered bauxite, glass, plastics, ceramic materials, processed wood, resin coated sand or ground nut shells or fruit pits or other composites, and any combination of the foregoing. Mixtures of different kinds or sizes proppants can be used as well. If sand is used, it typically will be from about 20 to about 100 U.S. Standard Mesh in size. For a synthetic proppant, mesh sizes from about 8-100 typically are used.

The proppant pack in the fracture provides a higher-permeability flow path for the oil or gas to reach the wellbore compared to the permeability of the surrounding subterranean formation. This flow path increases oil and gas production from the subterranean formation.

The concentration of proppant in the treatment fluid is preferably in the range of from about 0.03 kilograms to about 12 kilograms of proppant per liter of liquid phase (from about 0.1 lb/gal to about 25 lb/gal).

Well Treatment—Gravel Packing

An insoluble solid particulate also can be used for "gravel packing" operations. The insoluble particulate, when used for this purpose, is referred to as "gravel." More particularly in the oil and gas field and as used herein, the term "gravel" is sometimes used to refer to relatively-large insoluble particles in the sand size classification, that is, particles ranging in diameter from about 0.5 mm up to about 2 mm. Generally, low-strength proppants are used in gravel packing including sand.

Increasing Viscosity of Fluid for Suspending Particulate

Various particulates can be employed in a fluid for use in a well or a fluid can be used to help remove particulates from a well. As used herein, "particulate" or "particulate material" refers to matter in the physical form of distinct particles. The distinct particles have a high tendency to disperse. This tendency may be, for example, because the particles have already been dispersed (e.g., the water molecules of steam) or because the distinct particles are too large to be appreciably affected by Intermolecular Forces (e.g., dust or sand). In the context of oil and gas wells, a particulate can be a material that has particle sizes ranging anywhere from or between that of fines (measured in micrometers) and that of rock cuttings (up to a few centimeters).

For example, during drilling, rock cuttings should be carried by the drilling fluid and flowed out of the wellbore. The rock cuttings typically have specific gravity greater than 2.

Similarly, a proppant used in hydraulic fracturing typically has a much different density than water. For example, sand has a specific gravity of about 2.7, where water has a specific gravity of 1.0 at room temperature and pressure. A proppant having a different density than water will tend to separate from water very rapidly.

Increasing the viscosity of the water using a viscosity-increasing agent can help prevent a particulate having a different specific gravity than an external phase of the fluid from quickly separating out of the external phase.

Increasing Viscosity with Emulsions

The internal-phase droplets of an emulsion disrupt streamlines and require more effort to get the same flow rate. Thus, an emulsion tends to have a higher viscosity than the external phase of the emulsion would otherwise have by itself. This property of an emulsion can be used to help suspend a particulate material in an emulsion. This technique for increasing the viscosity of a liquid can be used separately or in combination with other techniques for increasing the viscosity of a fluid.

Increasing Viscosity with Viscosity-Increasing Agent

A viscosity-increasing agent is sometimes known in the art as a "thickener" or a "suspending agent," but it should be understood that increasing the viscosity, without more, may only slow the settling or separation of distinct phases.

Some viscosity-increasing agents can also help suspend a particulate material by increasing the elastic modulus of the fluid. An example of a viscosity-increasing agent that also increases the elastic modulus of a fluid is a viscoelastic surfactant. An elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm$^2$. As a point of reference, the elastic modulus of water is negligible and considered to be zero.

Viscosity-Increasing Agent—Water-Soluble Polysaccharides or Derivatives

A water-soluble polysaccharide can be used to increase the viscosity of a fluid. In general, the purpose of using such a polysaccharide is to increase the ability of the fluid to suspend and carry a particulate material.

A polysaccharide can be classified as being non-helical or helical (or random coil type) based on its solution structure in aqueous liquid media. Examples of non-helical polysaccharides include guar, guar derivatives, and cellulose derivatives. Examples of helical polysaccharides include xanthan, diutan, and scleroglucan, and derivatives of any of these.

As used herein, a "polysaccharide" can broadly include a modified or derivative polysaccharide. As used herein, "modified" or "derivative" means a compound or substance formed by a chemical process from a parent compound or substance, wherein the chemical skeleton of the parent exists in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete.

A guar derivative can be selected from the group consisting of, for example, a carboxyalkyl derivative of guar, a hydroxyalkyl derivative of guar, and any combination thereof. Preferably, the guar derivative is selected from the group consisting of carboxymethylguar, carboxymethylhydroxyethylguar, hydroxyethylguar, carboxymethylhydroxypropylguar, ethylcarboxymethylguar, and hydroxypropylmethylguar.

A cellulose derivative can be selected from the group consisting of, for example, a carboxyalkyl derivative of cellulose, a hydroxyalkyl derivative of cellulose, and any combination thereof. Preferably, the cellulose derivative is selected from the group consisting of carboxymethylcellulose, carboxymethylhydroxyethylcellulose, hydroxyethylcellulose, methylcellulose, ethylcellulose, ethylcarboxymethylcellulose, and hydroxypropylmethylcellulose.

As used herein, a polysaccharide is considered to be water soluble if it is soluble to the extent of at least 10 mg per liter in deionized water at 25° C. More preferably, the water-soluble polymer is also soluble to the extent of at least 10 mg per liter in an aqueous sodium chloride solution of 32 grams sodium chloride per liter of deionized water at 25° C. If desired, the water-soluble polymer can be mixed with a surfactant to facilitate its solubility in the water or salt solution utilized. The water-soluble polymer can have an average molecular weight in the range of from about 50,000 to 20,000,000, most preferably from about 1,000,000 to about 3,000,000.

Viscosity-Increasing Agent—Crosslinking of Polysaccharide to Form a Gel

Because of the high volume of fracturing fluid typically used in a fracturing operation, it is desirable to efficiently increase the viscosity of fracturing fluids to the desired viscosity using as little viscosity-increasing agent as possible. Being able to use only a small concentration of the viscosity-increasing agent requires a lesser amount of the viscosity-increasing agent in order to achieve the desired fluid viscosity in a large volume of fracturing fluid. Efficient and inexpensive viscosity-increasing agents include water-soluble polymers. Typical water-soluble polymers used in well treatments are water-soluble polysaccharides and water-soluble synthetic polymers (e.g., polyacrylamide, etc.). The most common water-soluble polysaccharide employed in well treatments is guar and its derivatives.

The viscosity of a fluid at a given concentration of viscosity-increasing agent can be greatly increased by crosslinking the viscosity-increasing agent. A crosslinking agent, sometimes referred to as a crosslinker, can be used for this purpose. One example of a crosslinking agent is the borate ion. If a polysaccharide is crosslinked to a sufficient extent, it can form a gel with water. Gel formation is based on a number of factors including the particular polymer and concentration thereof, the particular crosslinker and concentration thereof, the degree of crosslinking, temperature, and a variety of other factors known to those of ordinary skill in the art.

A "base gel" is a fluid that includes a viscosity-increasing agent, such as guar, but that excludes crosslinking agents. Typically, a base gel is a fluid that is mixed with another fluid containing a crosslinker, wherein the mixed fluid is adapted to form a gel after injection downhole at a desired time in a well treatment. A base gel can be used, for example, as the external phase of an emulsion.

Breaker for Viscosified Fluid

After a viscosified well fluid has served its purpose, it is often desirable to subsequently reduce the viscosity of the well fluid so that it can be more easily flowed back from a portion of a well.

Drilling or treatment fluids also commonly include a "breaker" for an emulsifier or other polymeric material to reduce the viscosity of the fluid after a desired time. For example, in the context of viscosity increase provided by a use of a polysaccharide, the term "break" or "breaker" as used herein refers to a reduction in the viscosity of a fluid or gel by some breaking of the polymer backbones or some breaking or reversing of the crosslinks between polymer molecules. No particular mechanism is necessarily implied by the term. A breaker for this purpose can be, for example, an acid, base, an oxidizer, an enzyme, chelating agent of metal crosslinker or a combination of these. The acids, oxidizers, or enzymes can be in the form of delayed-release or encapsulated breakers.

In the case of a crosslinked viscosity-increasing agent, for example, one way to diminish the viscosity is by breaking the crosslinks. For example, the borate crosslinks in a borate-crosslinked gel can be broken by lowering the pH of the fluid. At a pH above 8, the borate ion exists and is available to crosslink and cause gelling. At a lower pH, the borate ion reacts with proton and is not available for crosslinking, thus, an increase in viscosity due to borate crosslinking is reversible.

Polysaccharide as Friction Reducer

There are other uses for a water-soluble polysaccharide in a well fluids. For example, during the drilling, completion, and stimulation of subterranean a well, it is common to pump a water-based well fluid through tubular goods (e.g., pipes, coiled tubing, etc.) and into a subterranean formation adjacent a wellbore. A considerable amount of energy may be lost due to friction of the water-based well fluid in turbulent flow through the tubular goods of the wellbore. Because of these energy losses, additional pumping horsepower may be necessary to achieve the desired purpose of the well fluid. To reduce these energy losses, a water-soluble polysaccharide may be included in a water-based well fluid. The use of an appropriate water-soluble polysaccharide as a friction reducer in a well fluid is expected to reduce the energy losses due to friction.

For example, in a "high-rate water fracturing treatment," proppant suspension in the treatment fluid is largely achieved by the high rate of pumping and the high flow rate of the treatment fluid. To reduce energy losses due to friction, a water-soluble polysaccharide as a friction reducer may be included in the fracturing fluid. While a fluid used in high-rate water fracturing may contain a water-soluble polysaccharide as a friction-reducing polymer, the polysaccharide is usually included in the fracturing fluid in an amount that is sufficient to provide the desired friction reduction without appreciably viscosifying the fluid and usually without a crosslinker. As a result, the fracturing fluids used in these high-rate water-fracturing operations generally have a lower viscosity than conventional fracturing fluids.

Spacer Fluids

A spacer fluid is a fluid used to physically separate one special-purpose fluid from another. Special-purpose fluids are typically prone to contamination, so a spacer fluid compatible with each is used between the two. A spacer fluid is used when changing well fluids used in a well. For example, a spacer fluid is used to change from a drilling fluid during drilling a well to a cement slurry during cementing operations in the well. In case of an oil-based drilling fluid, it should be kept separate from a water-based cementing fluid. In changing to the latter operation, a chemically treated water-based spacer fluid is usually used to separate the drilling fluid from the cement slurry. Another example is using a spacer fluid to separate two different treatment fluids.

Well Fluid Additives

A well fluid can contain additives that are commonly used in oil field applications, as known to those skilled in the art. These include, but are not necessarily limited to, inorganic water-soluble salts, breaker aids, surfactants, oxygen scavengers, alcohols, scale inhibitors, corrosion inhibitors, fluid-loss additives, oxidizers, and bactericides.

Variations in Well Fluid Over Time

Unless the specific context otherwise requires, a "well fluid" refers to the specific properties and composition of a fluid at the time the fluid is being introduced through the wellhead into a wellbore. In addition, it should be understood that, during the course of a well operation such as drilling, cementing, completion, or intervention, or during a specific treatment such as fluid-loss control, hydraulic fracturing, or a matrix treatment, the specific properties and composition of a type of well fluid can be varied or several different types of well fluids can be used. For example, the compositions can be varied to adjust viscosity or elasticity of the well fluids to accommodate changes in the concentrations of proppant desired to be carried down to the subterranean formation from initial packing of the fracture to tail-end packing. It can also be desirable to accommodate expected changes in temperatures encountered by the well fluids during the course of the treatment. By way of another example, it can be desirable to accommodate the longer duration that the first treatment fluid may need to maintain viscosity before breaking compared to the shorter duration that a later-introduced treatment fluid may need to maintain viscosity before breaking. Changes in concentration of the proppant, viscosity-increasing agent, or other additives in the various treatment fluids of a treatment operation can be made in stepped changes of concentrations or ramped changes of concentrations.

Continuum Mechanics and Rheology

One of the purposes of identifying the physical state of a substance and measuring the viscosity of a fluid substance is to establish whether it is pumpable under the ranges of physical conditions that may be encountered at a wellhead and with the types and sizes of pumps available to be used for pumping fluids into a well. Another purpose is to determine what the physical state of the substance and its physical properties will be during pumping through a wellbore and under other downhole conditions in the well, including over time and changing temperatures, pressures, and shear rates. For example, in some applications, a well fluid forms or becomes a gel under downhole conditions that later is broken back to a fluid state.

Continuum mechanics is a branch of mechanics that deals with the analysis of the kinematics and the mechanical behavior of materials modeled as a continuous mass rather than as discrete particles. Rheology is the study of the flow of matter: primarily in the liquid state, but also as "soft solids" or solids under conditions in which they respond with plastic flow rather than deforming elastically in response to an applied force. It applies to substances that have a complex structure, such as muds, sludges, suspensions, gels, etc. The flow of such substances cannot be characterized by a single value of viscosity, which varies with temperature, pressure, and other factors. For example, ketchup can have its viscosity reduced by shaking (or other forms of mechanical agitation) but water cannot.

As used herein, if not other otherwise specifically stated, the physical state of a substance (or mixture of substances) and other physical properties are determined at a temperature of 77° F. (25° C.) and a pressure of 1 atmosphere (Standard Laboratory Conditions) without any applied shear.

Fluid State and Viscosity

In general, a fluid is an amorphous substance that is or has a continuous phase and that tends to flow and to conform to the outline of its container. Examples of fluids are gases and liquids. A gas (in the sense of a physical state) refers to an amorphous substance that has a high tendency to disperse and a relatively high compressibility. A liquid refers to an amorphous substance that has little tendency to disperse and relatively high incompressibility. The tendency to disperse is related to Intermolecular Forces (also known as van der Waal's Forces).

Viscosity is the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate. The viscosity of a fluid is usually expressed in units of centipoise ("cP").

The physical state of a substance and the viscosity of a fluid are highly dependent on the nature of the substance and the physical conditions, primarily temperature and pressure. In addition, the physical state and the viscosity of a fluid may depend on shear stress and shear rate and the viscosity may vary over time with continuing shear. Newton's law of viscosity is an approximation that holds for some substances but not others. Non-Newtonian fluids exhibit a more complicated relationship between shear stress and velocity gradient than simple linearity. Thus, there exist a number of forms of viscosity. Newtonian fluids, such as water and most gases, have a constant viscosity with rate of shear. Shear thickening fluids have a viscosity that increases with the rate of shear. Shear thinning fluids have a viscosity that decreases with the rate of shear. Thixotropic fluids become less viscous over time when shaken, agitated, or otherwise stressed. Rheopectic fluids become more viscous over time when shaken, agitated, or otherwise stressed. A Bingham plastic is a material that behaves as a solid at low stresses but flows as a viscous fluid at high stresses.

There are numerous ways of measuring and modeling viscous properties, and new developments continue to be made. The methods depend on the type of fluid for which viscosity is being measured. A typical method for quality assurance or quality control (QA/QC) purposes uses a couette device, such as a Fann Model 50 viscometer, that measures viscosity as a function of time, temperature, and shear rate. The viscosity-measuring instrument can be calibrated using standard viscosity silicone oils or other standard viscosity fluids. Due to the geometry of most common viscosity-measuring devices, however, large particles of solid particulate, such as proppant or gravel used in certain well treatments, would interfere with the measurement. Therefore, the viscosity of a fluid containing such large solid particulate is usually inferred by measuring the viscosity of a test fluid that is similar to the fracturing fluid without any proppant included.

Gel State and Deformation

A gel state is a semi-solid, jelly-like state that can have properties ranging from soft and weak to hard and tough. Shearing stresses below a certain finite value fail to produce permanent deformation. The minimum shear stress which will produce permanent deformation is known as the shear or gel strength of the gel.

Substance of a Fluid or Gel can be a Dispersion

A dispersion is a system in which particles are dispersed in a external phase of a different composition or physical state. A dispersion can be classified a number of different ways, including based on the size of the dispersed-phase particles, whether or not precipitation occurs, and the presence of Brownian motion. For example, a dispersion can be considered to be homogeneous or heterogeneous based on being a solution or not, and if not a solution, based on the size of the dispersed-phase particles (which can also refer to droplet size in the case of a dispersed liquid phase).

The substance of a fluid can be a single chemical substance or a dispersion. For example, water (a liquid under Standard Laboratory Conditions) is a single chemical by that name. An aqueous salt solution is a dispersion.

The substance of a gel is a dispersion. The gel state is formed by a network of interconnected molecules, such as of a crosslinked polymer or of micelles, with other molecules in liquid form. The network gives a gel material its structure (hardness) and contributes to stickiness (tack). By weight, the substance of gels is mostly liquid, yet they behave like solids due to the three-dimensional network with the liquid. At the molecular level (nanometer scale), a gel is a dispersion in which the network of molecules is the continuous (external) phase and the liquid is the discontinuous (internal) phase; however, the gel state, although heterogeneous, is generally considered to be a single phase.

Classification of Dispersions: Homogeneous and Heterogeneous

A dispersion is considered to be homogeneous if the dispersed phase particles are dissolved in solution or the particles are less than about 1 nanometer in size.

A solution is a special type of homogeneous mixture. A solution is homogeneous because the ratio of solute to solvent is the same throughout the solution and because solute will never settle out of solution, even under powerful centrifugation. An aqueous solution, for example, saltwater, is a homogenous solution in which water is the solvent and salt is the solute.

Except for the special case of a solution, a dispersion is considered to be heterogeneous if the dispersed-phase particles are greater than about 1 nanometer in size. (For reference, the diameter of a molecule of toluene is about 1 nm).

Classification of Heterogeneous Dispersions: Colloids and Suspensions

Dispersions can be further classified based on particle size and other characteristics.

A heterogeneous dispersion is a "colloid" where the dispersed-phase particles are in the range of about 1 nanometer to about 50 micrometer in size. Typically, the dispersed-phase particles of a colloid have a diameter of between about 5 to about 200 nanometers. Such particles are normally invisible to an optical microscope, though their presence can be confirmed with the use of an ultramicroscope or an electron microscope.

A heterogeneous dispersion is a "suspension" where the dispersed-phase particles are larger than about 1 micrometer. Such particles can be seen with a microscope, or if larger than about 0.1 mm, with the naked eye.

Classification of Colloids or Suspensions: External Phase

Colloids or suspensions can have solid, liquid, or gas as the external phase.

In the cases where the external phase of a dispersion is a liquid, for a colloidal fluid the dispersed-phase particles are so small that they do not settle. Unlike colloids, however, a suspension of particles dispersed in a liquid external phase will eventually separate on standing, e.g., settle in cases where the particles have a higher density than the liquid phase. Suspensions having a liquid external phase are essentially unstable from a thermodynamic point of view; however, they can be kinetically stable over a large period of time, depending on temperature and other conditions.

An example of a suspension of a solid in a liquid would be sand in water. In case the dispersed-phase particles are liquid in an external medium that is another liquid, this kind of suspension is more particularly referred to as an emulsion. Suspensions and emulsions are commonly used as well fluids.

Emulsions

More particularly, an emulsion is a dispersion of immiscible liquid as droplets into an external liquid phase. In addition, the proportion of the external and internal phases is above the solubility of either in the other. A chemical (an emulsifier or emulsifying agent) can be included to reduce the interfacial tension between the two immiscible liquids to help with stability against coalescing of the internal liquid phase.

An emulsion can be an oil-in-water (o/w) type or water-in-oil (w/o) type. A water-in-oil emulsion is sometimes referred to as an invert emulsion. In the context of an emulsion, a "water" liquid phase refers to water or an aqueous solution and an "oil" liquid phase refers to any organic liquid that is immiscible with water, such as an oleaginous liquid. Examples of oleaginous liquids include: diesel, kerosene, mineral oil, an ester, an alpha-olefin, crude oil, synthetic oil, and any combination thereof.

It should be understood that multiple emulsions are possible, which are sometimes referred to as nested emulsions. Multiple emulsions are complex polydispersed systems where both oil-in-water and water-in-oil emulsions exist simultaneously in the fluid, wherein the oil-in-water emulsion is stabilized by a lipophilic surfactant and the water-in-oil emulsion is stabilized by a hydrophilic surfactant. These include water-in-oil-in-water (w/o/w) and oil-in-water-in-oil (o/w/o) type multiple emulsions. Even more complex polydispersed systems are possible. Multiple emulsions can be formed, for example, by dispersing a water-in-oil emulsion in water or an aqueous solution, or by dispersing an oil-in-water emulsion in oil.

Foams

In addition, a dispersion can be a foam, which is a liquid that includes a dispersion of undissolved gaseous bubbles that foam the fluid, usually with the aid of a chemical (a foaming agent) to achieve stability.

Classification of Fluids: Water-Based or Oil-Based

The continuous phase of a substance as a whole is the most external phase, regardless of the number of phases. As used herein, a "water-based fluid" means that water or an aqueous solution is the continuous phase of the fluid as a whole. In contrast, an "oil-based fluid" means that oil is the continuous phase of the fluid as a whole. In the context of classifying the one or more liquid phases of a fluid, a "water" liquid phase refers to water or an aqueous solution and an "oil" liquid phase refers to any organic liquid that is immiscible with water, such as an oleaginous liquid. Examples of oleaginous liquids include: diesel, kerosene, mineral oil, an ester, an alpha-olefin, crude oil, synthetic oil, and any combination thereof.

It is desirable to improve methods for producing crude oil or natural gas. It is desirable to provide well fluids and methods for use in wells that provide advantages over known fluids and methods.

SUMMARY OF THE INVENTION

Nanohybrid-containing fluids and methods of using such fluids in a well are provided. It is believed a nanohybrid can stabilize phase interfaces. The methods include the steps of: (a) forming or providing a well fluid comprising a nanohybrid; and (b) introducing the well fluid into a well. The fluids and methods can be used in various applications for producing oil or gas, such as in drilling, completion, or intervention operations.

According to an embodiment of the invention, methods of using nanohybrid-stabilized emulsions in a well are provided. The methods include the steps of:

(a) forming an emulsion comprising:
(i) a nanohybrid;
(ii) water or an aqueous solution; and
(iii) a water-immiscible liquid;
(b) introducing a well fluid comprising the emulsion into a well; and
(c) after the step of introducing, modifying of the nanohybrid to break the emulsion in the well. According to the invention, it is recognized that the nanohybrid can be modified or completely destroyed, which can be used as a "switch" to selectively break the emulsion. This can be useful where the surface activity of the nanohybrid is needed for a certain period and then that surface activity is needed to be "turned off."

According to another embodiment, methods of altering the wettability of a surface in a well are provided. The methods include the steps of:
(a) providing a well fluid comprising a nanohybrid;
(b) introducing the well fluid into a well to contact the surface in the well,
wherein the contact angle of water or an oil on the surface is altered.

According to yet another embodiment, foamed fluids including a nanohybrid and methods of using such a foamed fluid in a well are provided. The foamed fluid includes: (i) a nanohybrid; (ii) a liquid phase; and (iii) a gaseous phase. The methods include the steps of:
(a) forming a foam comprising:
(i) a nanohybrid;
(ii) a liquid phase; and
(iii) a gaseous phase; and
(b) introducing a well fluid comprising the foam into the well.

According to this embodiment, a nanohybrid can be used to stabilize the liquid-gaseous interface of the foam, or an emulsion of the liquid phase, or both. The liquid phase can be an oil-based liquid or a water-based liquid. The liquid phase can be a single liquid phase or an emulsion. The foam can optionally include a particulate, such as a proppant, or other components.

As will be appreciated by a person of skill in the art, the methods according to the invention can have application in various kinds operations involved in the production of oil and gas, including drilling, completion, and intervention, such as the various examples described in the background.

The features and advantages of the present invention will be apparent to those skilled in the art. While numerous changes may be made by those skilled in the art, such changes are within the spirit of the invention.

DETAILED DESCRIPTION OF PRESENTLY PREFERRED EMBODIMENTS AND BEST MODE

General Definitions and Usages

General Terms

The words "comprise," "containing," and "include" and all grammatical variations thereof are intended to have an open, non-limiting meaning. For example, a composition comprising one component does not exclude the composition having additional components, an apparatus having an element or part does not exclude additional elements or parts, and a method having a step does not exclude methods having additional steps.

While compositions, apparatuses, and methods are described in terms of "comprising," "containing," or "including" various components, parts, or steps, the compositions, apparatuses, and methods are that "consist essentially of" or "consist of" the various components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. are assigned arbitrarily and are merely intended to differentiate between two or more components, parts, or steps that are similar or corresponding in nature, structure or function, or action. For example, the words "first" and "second" serve no other purpose and are not part of the name or description of the following name or descriptive terms. Further, the mere use of the term "first" does not require that there be any "second" similar or corresponding component, part, or step. Similarly, the mere use of the word "second" does not require that there by any "first" or "third" similar or corresponding component, part, or step.

Specific Terms

As used herein, a material is considered to be "soluble" in a liquid if at least 10 mg of the material can be dissolved in one liter of the liquid when tested at 77° F. and 1 atmosphere pressure and considered to be "insoluble" if less than that.

Unless otherwise specified, any ratio or percentage means by weight.

As used herein, the phrase "by weight of the water" means the weight of the water of the continuous phase of the fluid as a whole without the weight of any proppant, viscosity-increasing agent, dissolved salt, or other materials or additives that may be present in the water.

Unless otherwise specified, any doubt regarding whether units are in U.S. or Imperial units, where there is any difference U.S. units are intended herein. For example, "gal/Mgal" means U.S. gallons per thousand U.S. gallons.

Unless otherwise specified, as used herein, the viscosity of a fluid is measured at 40 sec−1 and at room temperature of about 77° F. (25° C.).

Nanohybrids for Stabilizing Emulsions

According to an embodiment, a purpose of this invention is to use nanohybrids comprising a carbon nanotube and inorganic second component (e.g., silica, alumina, magnesium oxide, titanium oxide, etc.) for use in emulsions for oil-field applications. More particularly, these nanohybrids contain the hydrophobic carbon nanotube and the hydrophilic inorganic component (e.g., silica) attached to each other.

The inherent hydrophobic and hydrophilic character gives these nanohybrids surface-active properties. The hydrophilic-lipophilic balance ("HLB") of the nanohybrid can be tailored by chemical functionalization of the nanohybrid to get the desired properties. More specifically, the HLB can be tailored by functionalization of nanotubes to make them more hydrophilic. The nanotubes can be made progressively more hydrophilic to make the HLB higher assuming that in the beginning the nanohybrid has a low HLB, i.e., it is more oil like. If made to be too hydrophilic, however, the material will lose its surface-active properties as there would not be both a hydrophobic and hydrophilic part in the hybrid. This invention takes advantage of this in the forming and then breaking of an emulsion. Similarly, if nanohybrid is made to be too hydrophobic, the material will lose its surface-active properties as there would not be both a hydrophobic and hydrophilic part in the hybrid. This can also be used as a method to break the emulsion.

The surface-active nanohybrids partition at the interface of an aqueous phase and an oil phase. This is different from conventional surfactants that form micelles. The thermodynamic energy required to displace particles stabilized or nanohybrid stabilized emulsion from the interface is very high in comparison to conventional surfactants. Therefore, these emulsions formed with surface-active nanohybrids are much more stable than conventional surfactants that form micelles. Without being limited by any theory, it is not presently known whether the nanohybrids form a micelle. But, it is believed the thermodynamic reason these hybrids at least form a more stable interface is that there is a collected integral of all the energy forces caused by the hybrid at the interface, whilst the normal single entity surfactants can flow in and out of the interface more easily. Pulling the relatively big nanohybrid from the interface is believed to require high energy.

Nanohybrids are a new class of hybrid materials is made from carbon nanotubes (CNTs) and inorganic glasses or ceramics, which are sometimes known as CNT-inorganic hybrids. The many advantages of CNTs in hybrid materials include their high aspect ratio (>1,000) and tubular geometry, which provides ready gas access to a large specific surface area and percolation at very low volume fractions. CNTs have been combined with a variety of inorganic compounds, including oxides, nitrides, carbides, chalcogenides, and ceramics. In contrast to nanocomposites, the CNTs are coaxially coated with the inorganic compound. Dominik Eder, Carbon Nanotube-Inorganic Hybrids, Chem. Rev. 2010, 110, 1348-1385.

In simple terms, CNTs are tubular structures made of rolled-up layers of interconnected carbon atoms with diameters ranging from about one nanometer to tens of nanometers and lengths up to tens of microns. CNTs can be open-ended or closed by a hemispherical fullerene-type cap, depending on the synthesis method. Along with structures related to those of fullerenes, CNTs are considered a third allotropic form of carbon, with the others being diamond and graphite. They are classified as either (a) "single-walled" tubes (SWCNTs, $0.7<d<2$ nm), which consist of a single layer of graphene sheet seamlessly rolled into a cylindrical tube, or (b) multi-walled CNTs (MWCNT, $1.4<d<150$ nm), which comprise multiple concentric tubes separated by about 0.34 nm. In general, CNTs possess large specific surface areas due to their hollow geometry, while their structural integrity and chemical inertness support relatively high oxidation stability. Other advantages include their exceptional physical properties. Dominik Eder, Carbon Nanotube-Inorganic Hybrids, Chem. Rev. 2010, 110, 1348-1385.

In general, CNTs can be functionalized by (a) covalent attachment of chemical groups through bonding to the π-conjugated skeleton of the CNT or (b) noncovalent adsorption or wrapping of various functional molecules. The CNT reactivity is directly related to the π-orbital mismatch caused by an increased curvature. Therefore, a distinction must be made between the sidewall and the endcaps of a nanotube. The sidewalls can be considered as curved graphite, while the tips are like the structure of a fullerene hemisphere and are thus relatively reactive. Hence, most reactions will occur first at the tips and then on the sidewalls. Dominik Eder, Carbon Nanotube-Inorganic Hybrids, Chem. Rev. 2010, 110, 1348-1385.

The various synthesis strategies for CNT-inorganic hybrids can be categorized as ex situ and in situ techniques. The ex situ (building block) approach first produces the inorganic component in the desired dimensions and morphology (typically spherical nanoparticles), then modifies and attaches this component to the surface of CNTs via covalent, noncovalent, or electrostatic interactions. In contrast, the in situ approach carries out the synthesis of the inorganic component in the presence of pristine or functionalized CNTs, onto which the inorganic material grows as particles, nanowires, or thin films. Dominik Eder, Carbon Nanotube-Inorganic Hybrids, Chem. Rev. 2010, 110, 1348-1385.

Surface-active nanohybrids are a new class of surfactant material. Such nanohybrids were developed by Professor Daniel Resasco at the University of Oklahoma, and are currently commercially available from SouthWest NanoTechnologies Inc. in Norman, Okla. See Min Shen and Daniel E. Resasco, Emulsions Stabilized by Carbon Nanotube-Silica Nanohybrids, *Langmuir* 2009, 25(18), 10843-10851, Jun. 17, 2009. These nanohybrids have been shown to make water-in-oil emulsions that are stable in temperature range of about 50° C. to about 250° C., pH range of 1 to 9, pressures of about 900 psi, and in salt solutions. In addition, the stability of the emulsion is not compromised by diluting the emulsion with NaCl solution. A minuscule amount of an aqueous liquid in a water-in-oil emulsion comes out of the emulsion, but the bulk remains in the emulsion. The nanohybrid made from multi-walled carbon nanotubes ("MWNT") gives better performance than single-walled carbon nanotubes ("SWNT") in stabilizing emulsions. In addition, MWNT are currently much less expensive than SWNT, which provides a commercial advantage over SWNT.

Well Fluid as Emulsion

If desired, the well fluids suitable for use in the present invention may be used in the form of an emulsion or including a liquid phase in the form of an emulsion. An example of a suitable emulsion would comprise an aqueous fluid comprising a viscosity-increasing agent and a hydrocarbon as another phase. In some embodiments, the external phase of the emulsion would be aqueous. For example, in some embodiments the emulsion can comprise approximately 30% of an aqueous base fluid and 70% of a suitable hydrocarbon. In other embodiments, the external phase of the emulsion would be oil. In certain embodiments, it may be desirable to use an emulsion to, among other things, reduce fluid loss to the subterranean formation or to provide enhanced particulate suspension.

Step of Forming an Emulsion

The invention can include a step of forming an emulsion comprising: (i) a nanohybrid; (ii) water or an aqueous solution; and (iii) a water-immiscible liquid. Without being limited by any theory, it is believed that the nanohybrid functions to help emulsify and maintain the stability of the emulsion. As used herein, an "emulsifier" means that it helps prevent the droplets of the internal dispersed phase from flocculating or coalescing in the external phase. The nanohybrid helps stabilize the emulsion, but optionally other surfactants, particulate materials, or polymers can also be included to further enhance the stability of the emulsion.

According to an embodiment, the nanohybrid has a hydrophilic-lipophilic balance adapted to forming an oil-in-water emulsion. According to another embodiment, the nanohybrid has a hydrophilic-lipophilic balance adapted to forming a water-in-oil emulsion. Generally, nanohybrids are hydrophobic prior to any derivatization and prior to any derivitization will make water-in-oil emulsion.

According to an embodiment, a dispersed phase of the emulsion comprises a chemical to be released from the dispersed phase upon the step of modifying the nanohybrid to break the emulsion. For example, the chemical to be released can include a crosslinker or a breaker for polysaccharide in fracturing applications in which delayed crosslinking or breakage is desired. It can also be used to release cement retarder or accelerator for cementing applications.

Preferably, the water-immiscible liquid is water insoluble. The emulsion can also include other additives.

The emulsion can also contain water-soluble salt(s) at a high-ionic strength for other purposes, for example, to increase the density of the continuous phase of the emulsion or to prevent the swelling of the clay in the formation. Preferably, the water-soluble salt is selected from the group consisting of: an alkali metal halide, alkaline earth halide, alkali metal formate, and any combination thereof in any combination.

The emulsion can contain a freezing-point depressant. More preferably, the freezing point depressant is for the continuous phase of the emulsion as a whole. Preferably, the freezing-point depressant is selected from the group consisting of water-soluble ionic salts, alcohols, glycols, urea, and any combination thereof in any proportion.

The emulsion can include water-soluble salt(s) at a high-ionic strength. The method can also include the step of adding the emulsion to an aqueous solution of a high-ionic strength prior to or during the step of introducing.

The emulsion can include a proppant. The method can include the step of mixing the emulsion with another fluid comprising the proppant to form a treatment fluid prior to or during the step of introducing. Preferably, the proppant is in a particulate size distribution range such that at least 90% of the proppant has a size within the range of 0.0625 mm to 2.0 mm. For fracturing in certain formations, such as shale formations, the proppant may be down to about 100 mesh.

Stability of the Emulsion Composition

Preferably, an emulsion composition used in a method according to the present invention is highly stable under a wide range of downhole conditions such that it will not cream, flocculate, or coalesce in use downhole until the emulsion is broken. For example, as used herein, it should be stable at 77° F. for at least 10 days. In downhole conditions at a higher temperature, it should be stable for at least the time of the job until it is desired to be broken.

As used herein, the term "cream" means at least some of the droplets of a dispersed phase converge towards the surface or bottom of the emulsion (depending on the relative densities of the liquids making up the continuous and dispersed phases). The converged droplets maintain a discrete droplet form. As used herein, the term "flocculate" means at least some of the droplets of a dispersed phase combine to form small aggregates in the emulsion. As used herein, the term "coalesce" means at least some of the droplets of a dispersed phase combine to form larger drops in the emulsion. It should be understood that an emulsion is visually examined for creaming, flocculating, or coalescing.

Preferably, an emulsion composition according to the invention is stable under one or more of certain conditions commonly encountered in the storage and use of such an emulsion composition for use in a well. For example, an emulsion composition according to the invention is preferably stable for storing, including under freeze-thaw conditions, to high-temperature well environments, to the addition of salts to give a high-ionic strength to the water phase of the emulsion, or to diluting the emulsion with high concentrations of water or solutions having high-ionic strength. Most preferably, an emulsion according to the invention has all of these advantages.

As used herein, stability to storing means stability to storing at 77° F. for 10 days. As used herein, stability to "freeze-thaw conditions" means to cooling from 77° F. to 0° F. and warming back to 77° F. Preferably, the dispersed phase does not cream, flocculate, or coalesce when tested under a freeze-thaw cycle from 77° F. to 0° F. and back to 77° F. More preferably, the dispersed phase does not cream, flocculate, or coalesce when cooled and stored at a temperature of 0° F. for 10 days and then warmed to 77° F.

As used herein, "high-temperature conditions" means in the range of 230° F.-500° F. Preferably, the emulsion does not cream, flocculate, or coalesce when tested at for the duration of the job under the temperature conditions of the job.

As used herein, "high-dilution conditions" means dilution with 5-20 times the amount of the external phase. Preferably, the dispersed phase of the emulsion does not cream, flocculate, or coalesce when tested by dilution with at least 5 times the amount of the external phase at 77° F. For example, the stability of a nanohybrid-stabilized oil-in-water emulsion is preferably not compromised by diluting the emulsion 15 times with 1 Molar NaCl solution.

Step of Storing the Emulsion Before Use

The method can optionally include the step of storing the emulsion for at least 7 days within a temperature range of 25° F.-120° F. between the step of forming and the step of introducing. The method can optionally include the step of storing the emulsion under conditions such that the emulsion undergoes at least one freeze-thaw cycle between the step of forming and the step of introducing.

Step of Introducing Emulsion into a Well

The method can optionally include a step of mixing the emulsion with another material to form a well fluid comprising the emulsion. A well fluid comprising the emulsion can include the emulsion as a nested emulsion in the fluid or the well fluid can be a dilution or other modification of the emulsion, provided that the emulsion is not broken before the step of introducing the well fluid into the well.

In an embodiment, the well fluid introduced into the well can be the emulsion.

In another embodiment, the method can comprise a step of mixing the emulsion with a third fluid to form the well fluid prior to or during the step of introducing the well fluid into the well. In an embodiment, the well fluid introduced into the well comprises the emulsion as a nested emulsion in a third fluid that is the continuous phase of the well fluid as a whole. The third fluid can include water and a water-soluble polysaccharide. The third fluid can include at least a sufficient concentration of the water-soluble polysaccharide to be capable of forming a crosslinked gel upon mixing with a crosslinker. The third fluid can optionally include water and one or more inorganic ionic salts.

In an embodiment, the well fluid can include at least one additive selected from the group consisting of: a conventional surfactant, an anti-scaling agent, a crosslinker, corrosion inhibitor, and a breaker for polysaccharide or crosslinked polysaccharide.

In yet another embodiment, the method can include a step of adding the emulsion to an aqueous solution of a high-ionic strength salt prior to or during the step of introducing.

According to an embodiment, the well fluid has an elastic modulus of greater than 1 Pa as measured within the linear viscoelastic region.

According to an embodiment, the well fluid is introduced into the well at a rate and pressure and directed to a subterranean formation at a rate and pressure that is at least sufficient to create at least one fracture in the subterranean formation of the well. The well fluid can further include a proppant. For example, the method can include a step of mixing the emulsion with a third fluid comprising a proppant prior to or during the step of introducing.

The step of introducing a well fluid comprising the emulsion into a well can be accomplished by pumping or injecting according to various techniques well known in the art.

Step of Breaking the Emulsion

According to the invention, it is recognized that the surface activity of these nanohybrid surfactants can be modified or completely destroyed, which property can be used as a "switch" for breaking an emulsion stabilized by a nanohybrid surfactant.

For example, oxidizing the carbon nanotube component and making it more hydrophilic can change the surface activity. An example of a suitable oxidizer is a nitric acid/sulfuric acid mixture to generate hydroxyl and carboxyl groups on the nanotubes to make them hydrophilic. It is also contemplated that the silica of the nanohybrid can be chemically removed or made oil-wet making it more hydrophilic. For example, silica can be reacted with long chain quaternary amine compounds to make them hydrophobic thereby making the whole of the nanohybrid hydrophobic. This will result in dissolution of the nanohybrid in the oil phase, thus breaking the emulsion. Either approach can be used as a "switch" useful in a variety of oil field applications, where surface activity is needed for a certain period and then that surface activity is needed to be turned off. The silica can also be reacted with silanes to make them hydrophobic or reacted with epoxides containing a long chain alkyl group to make them hydrophobic.

The emulsion can also be broken by addition of chemicals that functionalize the nanotube or form charge-transfer complexes. A hydrophilic group can be attached with the moiety that forms a charge-transfer complex with the carbon nanotube.

An emulsion stabilized with a nanohybrid can also be broken by wrapping the nanohybrid in a water-soluble polymer.

For a nanohybrid made up of some inorganic material other than silica, a suitable chemical group can be attached to make it more hydrophobic to break emulsion.

In some cases, these materials for modifying or destroying the nanohybrid can be included at the time of preparation of an emulsion. In other cases, the material can be pumped later to break the emulsion.

After the step of introducing, the methods include a step of modifying of the nanohybrid to break the emulsion in the well.

As used herein, to "break" an emulsion means to cause the creaming and coalescence of emulsified drops of the internal dispersed phase so that they the internal phase separates out of the external phase. Breaking an emulsion can be accomplished mechanically (for example, in settlers, cyclones, or centrifuges) or with chemical additives to increase the surface tension of the internal droplets.

Preferably, the step of modifying the nanohybrid is by modifying the hydrophilic-lipophilic balance ("HLB") of the nanohybrid such that it would no longer stabilize the original emulsion.

Preferably, according to one embodiment, the step of modifying the nanohybrid is with a strong oxidizing agent for the nanohybrid. The emulsion can be broken by treating the emulsion with an oxidizer such as nitric acid. The oxidizer functionalizes the carbon nanotubes of the nanohybrid and reduces their hydrophobic surface activity, thereby breaking the emulsion. Alternatively, an oxidizer can be incorporated in the aqueous phase of the emulsion and the emulsion can be tailored to self-degrade after a delay. An example of a suitable oxidizing agent is $HNO_3$.

According to an embodiment, the well fluid comprises a chemical for modifying the hydrophilic-lipophilic balance of the nanohybrid. According to another embodiment, a chemical for modifying the hydrophilic-lipophilic balance of the nanohybrid is pumped separately from the well fluid, for example, as a post flush over the well fluid or a pre-flush that flows back over the well fluid.

Emulsion Applications

The nanohybrid emulsions can be very stable, including, for example, at high temperatures (up to 250° C.), over a broad pH range, with high-ionic strength aqueous phases, and to high dilution. In addition, the nanohybrid can be tailored to have desired HLB for making emulsions useful in various applications. According to the methods, the emulsion can be chemically degraded or completely broken downhole.

These nanohybrid emulsions can be used for various oil field applications described below, such as in drilling, completion, or intervention operations.

Drilling Fluid and Drilling

The nanohybrids can be used to make emulsion-based well fluids for drilling and other application that can be used in the temperature range of 22° C. to 250° C. (71.6° F. to 482° F.). For drilling operations, water-in-oil emulsions are typically desired; however, oil-in-water emulsions are sometimes used. Oil-in-water emulsions are used in certain formations where oil wetting of the formation surface is not desired. The emulsion can also be used below 22° C. where winterization of the emulsion is undertaken by addition of salt to water phase or adding glycols or alcohols to the aqueous phase of the emulsion. For example, the stability of an oil-in-water emulsion is not compromised by diluting the emulsion (e.g., 15 times with 1 Molar NaCl solution). This is an advantage while drilling through a water-bearing formation, where integrity of the emulsion would otherwise be compromised by dilution with the invading water.

The emulsion can be broken by treating the emulsion with a chemical to change the surface activity of the nanohybrid according to one of the techniques described above, thereby breaking the emulsion. This is a way to remove a filter cake built by these drilling fluids. Alternatively, an chemical can be incorporated in the aqueous phase of the emulsion and the emulsion can be tailored to self-degrade after a delay.

Cementing Fluid and Cementing

An emulsion stabilized with a nanohybrid can be used to deliver an accelerator for delayed setting of a cement in a cementing application. The emulsion can be part of a cementing fluid. For example, the cement accelerator such as calcium chloride can be solubilized in the aqueous phase and then emulsion is prepared with nanohybrid and oil. The aqueous phase can optionally have breaker to break the emulsion to release calcium chloride accelerator. Similarly oxidizer can be encapsulated in the water-in-oil emulsion which can be broken down in cement by techniques described previously thereby releasing oxidizer that react with cement retarders present in the cement slurry to accelerate the setting of the cement. The emulsion can be broken by treating with a chemical to change the surface activity of the nanohybrid according to one of the techniques described above, thereby breaking the emulsion when desired to release the retarder or accelerator.

Fluid-Loss Control Pill and Fluid-Loss Control

An emulsion stabilized with a nanohybrid can be used in a fluid-loss control pill. In the fluid-loss pill the emulsion can contain oxidizer for breakage of the fluid-loss pill polymer and slowly release the breaker to break the pill. The emulsion can be broken by treating with a chemical to change the surface activity of the nanohybrid according to one of the techniques described above, thereby breaking the emulsion when desired. The emulsion can also be used to incorporate a crosslinker in the emulsion that may release slowly to crosslink the polymer. This will give the time to place the pill at a desired downhole location in the wellbore. These pills are very thick (e.g., 110 lb/Mgal crosslinked gels) and difficult to pump if fully crosslinked at the surface, that is, above the wellhead. Delaying the crosslinking until the pill reaches the downhole location is desirable. In other embodiments, water-in-oil emulsions can be used as a fluid-loss control agent as the droplets can be made big enough to plug the formation pores. This emulsion can be used in fracturing fluid or the pad to give the fluid-loss characteristic. The breaker inside the emulsion can break the emulsion and thus release the obstruction of pores after the job.

Acidizing Fluid and Acidizing

The nanohybrid can be used in the acidizing of carbonate rock. The nanohybrid can be used to make 15% HCl emulsion in oil (continuous phase) and can be pumped in the carbonate formation as a kind of matrix treatment. This nanohybrid-stabilized emulsion will provide acid systems that will slowly etch the carbonate formation and will help in making a longer fracture. Optionally polymers that gel the aqueous phase of the emulsion can be used to prevent the leakage of acid prematurely.

Controlling acid reaction rates by incorporation of the acid as an internal phase in an emulsion is well known. For ultra hot wells, such as the Khaff in Saudi Arabia, the conventional acid gel systems are not as temperature stable as the nanohybrid-stabilized emulsions would be, and thus new high-temperature acid retardation can be obtained.

The emulsion can be broken when desired by modifying the nanohybrid. For example, the aqueous phase can be loaded with an oxidizer to self-break the emulsion after a delay. Other examples of techniques for breaking the emulsion stabilized with a nanohybrid are described above.

Fracturing Fluid and Fracturing

Nanohybrid emulsions can be used to produce viscous fracturing fluids through emulsification that are stable at temperatures not currently obtainable even with synthetic polymers. The emulsion can be broken as desired, breaking at least some of the viscosity of the fluid. Besides applications at high temperature (up to 250° C.), the resulting conductivity impairment from the broken emulsion would be negligible, providing a benefit relative to most polymer thickened materials.

In addition, if the water phase of the emulsion is gelled, as in the Halliburton SuperEmulsifrac™ system, and the encapsulation feature of the invention is used (described below), it would provide a two-phase viscous system and a delayed crosslink feature, too.

For a fracturing application, a high internal phase emulsion ("HIPE emulsion"), which is water-in-oil, can be made with the nanohybrid system. High internal phase water-in-oil emulsions are defined as having greater than about 80% dispersed aqueous phase. These emulsions are capable of carrying proppants.

Fluid for Frac Packing or Gravel Packing

The nanohybrid can be used to stabilize an emulsion for use in "frac packing" or "gavel packing" operations. The emulsion can be broken as desired, breaking at least some of the viscosity of the fluid. Again, the nanohybrid-stabilized emulsion has applications at high temperature (up to 250° C.), the resulting conductivity impairment from the broken emulsion would be negligible, providing a benefit relative to most polymer thickened materials.

Emulsion Encapsulation for Delayed Chemical Release in a Well Application

A nanohybrid can also be used to encapsulate a chemical in an internal phase of an emulsion and then selectively break the emulsion to release the chemical in a controlled manner for use in a well operation, such as drilling, cementing, or treatment.

For example, a water-soluble chemical can be encapsulated in the internal water phase of a water-in-oil emulsion stabilized with a nanohybrid. The water-in-oil emulsion can then be emulsified in an outer water phase or aqueous fluid, either with a suitable conventional emulsifier or with a suitable nanohybrid. Upon breaking of the water-in-oil emulsion, the water-soluble chemical is released from the oil of the water-in-oil emulsion into the outer water phase.

Similarly, an oil-soluble chemical can be encapsulated in the internal oil phase of an oil-in-water emulsion stabilized with a nanohybrid. The oil-in-water emulsion can then be emulsified in an outer oil phase, either with a suitable conventional emulsifier or with a suitable nanohybrid. Upon breaking the oil-in-water emulsion, the oil-soluble chemical is released from the water of the oil-in-water emulsion into the outer oil phase. For example, esters can be solubilized in oil phase of the emulsion and then they hydrolyze to provide organic acids that can be used to break crosslinked fluid, solubilize calcium carbonate in filter cake to break filter cake and similar applications.

In an embodiment, the nanohybrid of the present invention can be doped with a crosslinker for a fracturing fluid. The rate of release would be adjusted to obtain the proper crosslink time. For example, as a fracturing fluid heats in a formation, being able to deliver via controlled release additional crosslinker or a different crosslinker would provide benefits in a fracturing treatment.

In another embodiment, a water-soluble breaker (for example, an enzyme, oxidizer, acid, etc.) for a crosslinked gel can be contained in the internal water phase of a water-in-oil emulsion stabilized with a nanohybrid. The water-in-oil emulsion is itself emulsified in an outer aqueous phase. Upon breaking the water-in-oil emulsion, the breaker is released from inside the oil phase to break an aqueous fracturing gel of the outer-aqueous phase after a desired delay.

Similarly, these techniques can be employed to encapsulate a breaker for a filter cake to help break the filter cake from the inside. Polymer-based fluid-loss control pills often require long cleanup periods. Moreover, an effective cleanup usually requires fluid circulation to provide high driving force, which allows diffusion to take place to help dissolve the concentrated build up of materials. Such fluid circulation may not be feasible. Additional methods of delivering or releasing a chemical to help remove a filter cake are desirable.

Viscous Sweep Application

Emulsions made by the nanohybrid can also be used to form a viscous fluid for viscous sweeps. In this application, a relatively small volume of viscous fluid is circulated to sweep, or remove, debris or residual fluids from the circulation system. The viscosity of the fluid can be broken by modifying the nanohybrid.

Spacer Fluid Application

A nanohybrid-stabilized emulsion can be used in a spacer fluid, for example, in a cement spacer. The nanohybrid can be used to control the viscosity of the spacer without the need for any polymer, can be broken on demand, and also the desired aqueous phase can be weighted with clear fluids, or the internal phase of the emulsion set to yield the desired viscosity. The high temperature stability of the emulsion allows achievement of higher temperatures than currently capable conventional polymers.

Swellable Packer Application

Rubber swellable packers are used to close the annulus between formation and the pipe. An oil-in-water emulsion stabilized according to the invention can be used to swell a swellable packer having an oil-swelling rubber element after a delay. A water-in-oil emulsion can be used to swell a swellable packer having a water-swelling packing material after a delay. A delay is desired for positioning the packer at the appropriate location in a wellbore before swelling the packer. After placing the swell packer the emulsion is broken by the methods described so that the internal phase can swell the packer and set it in place.

Treatment Fluid and Methods for Changing the Wettability of Solid Surfaces in Wells After a treatment of a portion of a well, some of the fluid is trapped in the formation or proppant pack and cannot be flowed back through and out of the well. For example, the success of a fracturing treatment is related to the amount of the fracturing fluid recovered after the treatment. Normally, the more fracturing fluid that is recovered, the higher the production of the well after the treatment.

Recovery of the fluid depends on several factors and among them capillary pressure is one of the most important. The capillary pressure $\Delta P$ is governed by a simple, albeit approximate, relation as shown in the following equation:

$$\Delta P = \frac{2\sigma}{r}\cos\theta$$

where $\sigma$ represents the surface tension of the fluid, r the radius of pore throat, and $\theta$ the contact angle. For a certain formation, pore throat size r is constant, and therefore there are only two parameters, namely $\sigma$ and $\theta$, that can be adjusted to manipulate the capillary pressure.

A common method is to add surfactants to the well fluid to reduce the surface tension $\sigma$ and thus the capillary pressure $\Delta P$, and consequently, the resistance to flowback. The limitation of the approach is that it is very hard to reduce the surface tension of an aqueous fluid.

Another method is to alter the wettability of a subterranean formation. Wetting and wettability involve the contact between a liquid and a solid surface, resulting from the intermolecular interactions when the two are brought together. The amount of wetting depends on the energies (or surface tensions) of the interfaces involved such that the total energy is minimized. One measurement of the degree of wetting is the contact angle, the angle at which the liquid-vapor interface meets the solid-liquid interface. If the wetting is very favorable, the contact angle will be low, and the fluid will spread to cover or "wet" a larger area of the solid surface. If the wetting is unfavorable, the contact angle will be high, and the fluid will form a compact, self-contained droplet on the solid surface. If the contact angle of water on a surface is low, the surface may be said to be "water-wetted" or "water-wettable," whereas if the contact angle of an oil droplet on a surface is low, the surface may be said to be "oil-wetted" or "oil-wettable."

As used herein, a water-wet surface has a contact angle for water between 0 to 90 degrees. A surface having a contact angle at or above ninety degrees for water is described as non-water wet. Similarly, an oil-wet surface has a contact angle for oil between 0 to 90 degrees. A surface having a contact angle at or above ninety degrees for oil is described as non-oil wet.

The wettability of the formation can be altered by changing the contact angle of the formation. By changing the contact angle, the capillary pressure to a water-based or oil-based fluid can be greatly changed. For example, when the contact angle $\theta$ becomes 90°, cos $\theta$ becomes zero, and so does the capillary pressure, or when the contact angle is larger than 90°, cos $\theta$ becomes negative, meaning the fluid is repelled by the pores in a subterranean formation.

One method of changing the wettability of a solid surface is using a chemical agent selected from a group consisting of organosiloxane, organosilane, fluoro-organosiloxane, fluoro-organosilane, and fluorocarbon. The fluid contains a sufficient amount of the agent to alter the wettability of the formation when the fluid contacts the formation. Fluids according to the present invention can further comprise nanoparticles. Optionally, nanoparticles, for example $SiO_2$ nanoparticles, can be added into a fluid comprising such a chemical agent. Nanoparticles are normally considered to be particles having one or more dimensions of the order of 100 nm or less. The surface property of a nanoparticle can be either hydrophilic or hydrophobic. Adsorption of the nanoparticles on the fracture surface or proppant surface may further enhance hydrophobicity and oleophobicity. Nanoparticles of different types and sizes are commercial available and have been used to treat solid surface, in combination with hydrophobizing agents, to make highly hydrophobic or oleophobic surfaces for various applications. Such a well fluid when introduced into a subterranean formation may alter the wettability of pores in the formation by changing the contact angle. Additional information regarding this method is disclosed in International Publication No. WO 2011/088556 A1 published on 28 Jul. 2011, having for named inventors Kewei Zhang, which is incorporated herein by reference in its entirety.

Other fluids are known to change the wettability of rock surfaces. For example, as discussed above, drilling fluids, also known as drilling muds or simply "muds," are typically classified according to their base fluid (that is, the continuous phase). In water-based muds, solid particles are suspended in water or brine. Oil can be emulsified in the water as the continuous phase. Brine-based drilling fluids are a water-based mud (WBM) in which the aqueous component is brine. Oil-based muds (OBM) are the opposite or inverse. Solid particles are often suspended in oil, and water or brine is emulsified in the oil and therefore the oil is the continuous phase.

Oil-based muds can be either all-oil based or water-in-oil macroemulsions, which are also called invert emulsions. In oil-based mud, the oil can consist of any oil that may include, but is not limited to, diesel, mineral oil, esters, or alpha-olefins. OBMs as defined herein also include synthetic-based fluids or muds (SBMs) which are synthetically produced rather than refined from naturally-occurring materials. SBMs often include, but are not necessarily limited to, olefin oligomers of ethylene, esters made from vegetable fatty acids and alcohols, ethers and polyethers made from alcohols and polyalcohols, paraffinic, or aromatic hydrocarbons, alkyl benzenes, terpenes and other natural products and mixtures of these types.

When OBMs, SBMs, or other non-aqueous fluids ("NAFs") are used, the subterranean rock formations become oil wet and resistant to treatments using well fluids that are water-based. Non-limiting examples of water-based well fluids include high-viscosity pills to help lift cuttings out of a vertical wellbore; freshwater pills to dissolve encroaching salt formations; pills to free stuck pipe, such as to relieve differential sticking forces or to destroy filter cake; lost circulation or fluid loss pills to plug a thief zone or inhibit fluid from being lost into a relatively high permeability zone; and crosslink pills to deliver and crosslink polysaccharides such as guar gums to increase viscosity in a certain zone to prevent or inhibit fluid loss.

Compositions and methods are desired to improve the ability to switch or convert the wettability of a rock formation or other solid surface that is oil-wettable to a water-wettable surface so that subsequently introduced water-based fluids would perform or be more effective. In some applications, it can also be desirable to change the wettability in the reverse direction.

It is believed, however, that fluids including a nanohybrid have not been known or used for altering the wettability of solid surface in a well.

In a non-limiting embodiment, the present invention includes methods and compositions for changing the wettability of solid surfaces in wells. The well fluid includes a nanohybrid. Preferably, the fluid contains a sufficient amount and concentration of a nanohybrid to alter the wettability of the formation when the fluid contacts the formation. The contact angle can be determined under standard laboratory conditions or under simulated bottom-hole conditions of temperature and pressure, whichever may be adequate or most useful to the application of the method. The wettability of a surface can be altered for water or for an oil.

In one non-limiting embodiment, a method is provided for changing the wettability of a rock formation or other solid surface in a well previously contacted with an oil-based mud (OBM). Generally, under such conditions the solid surface will have become oil-wet.

According to an embodiment, the method involves pumping such a well fluid into a subterranean formation, proppant pack, or other subterranean matrix of solid material. The well fluid with a nanohybrid can be one of several types, depending on the particular application. A person of skill in the art, with the benefit of this disclosure, will be able to determine the particular well fluid according to this invention that is suitable for the intended purpose of altering the wettability of the surface.

According to an embodiment, a method of altering the water wettability of a surface in a well, the method comprising the steps of: (a) providing a well fluid comprising a nanohybrid; and (b) introducing the well fluid into a well to contact the surface, wherein the contact angle of water on the surface is altered at least 10°. More preferably, the contact angle of water on the surface is altered at least 20°.

In an embodiment of this method, it can further include the step of determining the contact angle of water on the subterranean formation or proppant pack prior to the step of introducing the well fluid. This step of determining can be based on laboratory simulation or based on actual testing of a solid particulate of the solid that is flowed back from the well before the treatment. In another embodiment, the method can further include the step of determining the contact angle of water on the subterranean formation or proppant pack or other solid material downhole after to the step of introducing the well fluid. This step of determining can be based on laboratory simulation or based on actual testing of a solid particulate of the solid that is flowed back from the well after the treatment.

According to another embodiment, a method of altering oil wettability of a surface in a well, the method comprising the steps of: (a) providing a well fluid comprising a nanohybrid; and (b) introducing the well fluid into a well to contact the surface, wherein the contact angle of an oil on the surface is altered at least 10°. More preferably, the contact angle of the oil on the surface is altered at least 20°.

In an embodiment of this method, it can further include the step of determining the contact angle of the oil on the subterranean formation or proppant pack prior to the step of introducing the well fluid. In another embodiment, the method can further include the step of determining the contact angle of the oil on the subterranean formation or proppant pack after to the step of introducing the well fluid.

The oil liquid phase for determining the contact angle of oil can be an oleaginous liquid. For example, the oleaginous liquid can be selected from the group consisting of: diesel, kerosene, mineral oil, an ester, an alpha-olefin, crude oil, and synthetic oil, or any combination thereof.

According to an embodiment, the well fluid can include a composition that is an emulsion according to the invention, which composition contains: (i) at least one nanohybrid; (ii) water or an aqueous solution; and (iii) a water-immiscible liquid. That is, these compositions, e.g., an emulsion, are pre-formed.

According to another embodiment, the well fluid can include be in situ emulsion-forming components that include: (i) at least one nanohybrid; and (ii) water or an aqueous solution. That is, the emulsion is formed in situ downhole with the water-immiscible liquid already present on a solid surface to be treated with the well fluid. For example, a liquid already present on a solid surface can be adsorbed onto the surface.

By the use of one or both of these types of well fluids, the rock formation or proppant matrix is thereby contacted with a emulsion composition or an emulsion-forming composition as described above. By this method, the wettability of at least part or all of the rock formation, proppant pack, or other solid surface downhole is changed. Subsequently another treatment fluid, whose performance requires water-wet surfaces, such as a water-based treatment fluid, is pumped into the rock formation, proppant pack, or other matrix, and can be more effective.

The well fluid may optionally contain, for example, a surfactant, and optionally and a co-surfactant. For instance, if desired to form a microemulsion, it may be helpful, but is not always necessary, to add an alcohol co-surfactant, but in some instances (e.g. ionic surfactants at low temperature), it is often necessary or at least it makes the process easier. In many cases, the surfactant may be a surfactant blend and is often a surfactant and co-surfactant mixture, in which the co-surfactant is a short amphiphilic substance such as an alcohol (in non-limiting examples, propanol, butanol, pentanol in their different isomerization structures) as well as glycols, and ethoxylated and propoxylated alcohols or phenols. Alcohols are also noted herein as substances of intermediate polarity; that is, intermediate between water-immiscible substances such as oils and polar substances such as ethanol or water.

The well fluid can optionally contain, for example, an acid, such as a mineral acid or organic acid.

The majority of fluid-loss control pills and crosslink pills are formulated as water-based fluids. For this reason, it is desirable to remove the S/OBM and achieve a reversal of wettability in the formation, proppant pack, or other solid surfaces downhole, which may be naturally fractured or fracture induced, before pumping the fluid-loss control pills or other water-based well fluids. Other types of well fluids other than fluid-loss pills, with which the methods described herein would be effective include, but are not necessarily limited to, horizontal healer pills, reservoir rock cleaning pills, and crosslink pills. The change in wettability from oil-wet to water-wet increases the filtration rate or leak off rate of the fluid loss pill into the fractures and fracture tip and forms a tight plug that packs and seals the fracture voids. This method increases the tight packing of the particles of the fluid-loss control pill (or lost circulation pill) in the permeable and fractured formation, and in consequence, improves the effectiveness of the pill.

Without being limited by any theory, it is believed this wettability-changing method may occur by solubilization of a significant portion of the non-polar, water-immiscible material and eventually polar material into an emulsion when the well fluid contacts the oil-wetted rock or other material. An in situ emulsion can be formed when one or more nanohybrids and a polar phase (e.g. usually, but not limited to, water) contacts the reservoir formation and solubilizes some or all of the non-polar, water-immiscible fluid of the S/OBM or S/OBM filter cake encountered in the porous media (e.g. rock or proppant).

By "eventually" it is meant herein that the non-polar material and nanohybrid at some point later in time, such as downhole or separately added, contacts a polar fluid, such as reservoir fluids, or a fluid of intermediate polarity, such as a separately added alcohol or co-surfactant. By "eventually" it is meant that the contact is not necessary or compulsory, but that such eventual contact may not be ruled out.

The in situ emulsion removes (at least partially) the S/OBM, the S/OBM filter cake, promotes reversal of the wettability of the solid surface, and at least partially removes the oil of the filter cake in oil and gas wells drilled with SBM or OBM. The benefit of using an emulsion or in situ emulsion before a high fluid-loss squeeze pill or other water-based fluid treatment is that the rock formation and solid particles of the filter cake change from oil-wet to water-wet, which increases the strength or effectiveness of the water-based treatment fluid at the interface with the rock formation or other solid surface. This phenomenon of increasing the strength or effectiveness of a water-based treatment fluid is particularly important in the near wellbore region.

One of the benefits of the in situ fluid formation of the emulsion is that the well fluid does not require any oil or other water-immiscible solvent in its initial formulation, or at least much less than the proportion that could be solubilized in the final emulsion, which gives a higher capacity for oil or non-polar material incorporation or cleaning capability when contacted with the OBM and other non-polar materials on the rock formation, proppant pack, or other matrix downhole. Another benefit is that any particles or other oil-wet contamination turn from oil-wet to water-wet. Additionally, the well fluid can improve damage remediation (including, but not limited to, filter cake destruction) when mineral acids, organic acids, oxidizing agents, water-soluble enzymes (e.g. catalysts), or precursors of these components (e.g. in situ acid generators) are spotted into a subterranean formation after the wettability reversal process, because it favors the contact between the acid and the particles.

Without being limited by any theory, it is also believed this wettability-changing method may occur by depositing a layer of nanohybrid onto the oil-wet surface. A relatively non-polar end of the nanohybrid is believed to be capable of interfacing with an oil-wet surface, whereas the relatively polar end of the nanohybrid presents a water-wet surface.

Further, without being limited by any theory, it is believed the nanohybrid can adsorb at a liquid-solid interface to alter the wetting of the solid surface. Flow characteristics in porous media are altered by changing the contact angle as described by the Young-LaPlace equation. These nanohybrid materials can be added to any well fluid in order to change the wettability of formation, proppant, cement, or drilling fluid components as desired. In hydraulic fracturing, fluorocarbon surfactants have traditionally been applied for this application. It is believed the nanohybrid materials can be more permanent, cheaper, and easier to apply to porous media than the high molecular weight polymer fluorocarbons.

In one non-restrictive version, it may be desirable to use acid or other damage removal additives but only after a wettability change and more likely, some time after the drilling phase. As the OBM (or SBM) is contacted by the well fluid and absorbed or the oil-wet, non-polar materials and rock surfaces are converted from oil-wet to water-wet during the in situ formation of an emulsion, the blend of nanohybrid and a polar phase (e.g., water) may also contain acids, barite dissolvers (chelants) or other precursor additives that can dissolve the acid-soluble particles or dissolve the barite and other particulates and also break down any polymeric fluid loss additive (if present).

The net effect of such well fluids and methods will be to improve an operator's ability to pump water-based treatment fluids into a reservoir, for instance to improve fluid loss control, and thereby improve production rates in producing wells or reduce the costly loss of S/OBM drilling fluid in the fractured zone whether it be in the reservoir or above the reservoir. In either case, non-polar material alteration is accomplished by creating the in situ-formed fluid across the injection/production interval or pumping the pre-formed emulsion into the formation.

It will be appreciated that it is not necessary for all of the oil-wet rock or filter cake to have its wettability reversed for the inventive method and its compositions to be considered successful. Success is obtained if more of the oil-wetted rock formation is reversed and becomes water-wetted using the compositions or methods herein, whether not formed in situ than if it is not used, or if more rock surface becomes relatively more water-wet using the emulsions, as compared to the case where no nanohybrid emulsions or other similar compositions are used. Alternatively, the methods and compositions are considered successful if at least a portion of the rock formation becomes water wet. In one non-limiting embodiment at least a majority (>50%) of the rock becomes water-wet. In general, of course, it is desirable to convert as much of the rock formation from oil-wet to water-wet as possible. One non-restrictive goal of the methods and compositions herein is to reverse the wettability of the rock to obtain a higher percentage of effectiveness of the subsequently introduced water-based treatment fluids.

The subterranean reservoir wettability reversal technology described herein has a wide range of applications. By combining the chemical aspect of wellbore wetting reversibility or clean up with displacement techniques, it is believed that subterranean reservoir disadvantages after drill-in with OBMs (e.g. invert emulsion fluids) may be significantly reduced or eliminated.

The methods and compositions herein may be used to alter or reverse the wettability of subterranean rock, and may also remove, heal, or remediate damage caused by deposits of macromolecules from oils, such as the case of deposition of asphaltenes in the reservoir porous media. Other damage that may be removed includes any emulsions that incorporate or include any non-polar material (oil and other hydrocarbons) from the reservoir, or introduced in the drilling mud, as well as other substances injected downhole.

Thus, the methods and compositions herein have the advantages of being able to reverse the wettability of subterranean rock prior to the pumping of a well-fluid, such as a fluid-loss pill, to increase and improve the adherence of the fluid-loss pill or other well fluid to the formation, and as a consequence, improve the effectiveness of the well fluid, such as to control, prevent, or inhibit lost circulation. The well fluid may also reduce formation damage, and consequently increase hydrocarbon recovery, or increase water injection rate, as compared with an otherwise identical method and composition without the inventive emulsions (in situ or otherwise).

Foamed Fluids and Methods of Using Foamed Fluids

In some embodiments, the treatment fluids can be foamed (e.g., a liquid that includes a gaseous fluid, such as nitrogen, air, or carbon dioxide, as an internal phase). For example, in certain embodiments it may desirable that the treatment fluid is foamed to, among other things, reduce the amount of treatment fluid that is required, e.g. in water sensitive subterranean formations, to reduce fluid loss to the subterranean formation, enhance flow back of fluids, or to provide enhanced particulate suspension. In addition, in certain embodiments where the treatment fluids suitable for use in the present invention are used for fluid diversion, it may be desirable that the treatment be foamed.

Formation of a foam involves the generation of a large amount of surface area for the liquid phase to gaseous phase interface. Thus, the lower the surface tension of the liquid phase of the interface, the less energy is required to generate a given amount of foam. However, foam bubbles in pure low-viscosity fluids, such as an oil, are not stable and break almost instantaneously. To improve stability, there must be something present to stabilize the foam. Although water has a high surface tension (compared to an oil, such as an oleaginous liquid), and therefore might not be expected to form foam bubbles easily, bubbles in water are more easily stabilized since a wider variety of components in water can rapidly migrate to the surface of a bubble to stabilize it. For example, a surfactant not only reduces the surface tension of water, facilitating foam formation but also migrates to the surface of the droplets to give an oriented surface layer with a high viscosity, stabilizing the foam bubbles. To improve the stability of a water-based foam, surfactants are conventionally used to lower the surface tension of the gas-liquid interface and thus increase the lifetime of gas bubbles.

According to an embodiment of the invention, a nanohybrid can be used in a foam. The liquid phase can be an oil-based liquid or a water-based liquid. For example, the liquid phase can be an emulsion as described herein. The gaseous phase can be any convenient and acceptable gaseous material.

According to an embodiment, a method of using a foam in a well is provided, wherein the method comprises the steps of: (a) forming a foam comprising: (i) a nanohybrid; (ii) a liquid phase; and (iii) a gaseous phase; and (b) introducing a well fluid comprising the foam into the well.

The nanohybrid can be selected to stabilize the liquid-gaseous interface of the foam. Adjusting the properties of the nanohybrid material can produce a desired surface activity (surface tension) of a liquid phase. This is believed to be especially useful in producing an oil-based foam, which has never been commercially accomplished. In addition, for water foams, high temperature applications and breaking have both been problems, and a nanohybrid is believed to be able to solve these problems.

The method can additionally include the step of, after the step of introducing, modifying the nanohybrid to break the foam in the well.

Preferably, the liquid phase is an oil-based liquid. For example, the liquid phase can be oil or a water-in-oil emulsion. The nanohybrid can be selected to stabilize the water-in-oil emulsion of the foam.

The liquid phase can be a water-based liquid. For example, the liquid phase can be water, an aqueous solution, or an oil-in-water emulsion. The nanohybrid can be selected to stabilize the oil-in-water emulsion of the foam. If desired, the water-based liquid can include a viscosity-increasing agent. Using nanohybrids to foam pure oils would be a major advancement.

While various gases can be utilized for foaming the treatment fluids of this invention, nitrogen, carbon dioxide, and mixtures thereof are preferred. Preferably, the gaseous phase is at least 5% by volume of the well fluid. In examples of such embodiments, the gas may be present in a treatment fluid suitable for in an amount in the range of from about 5% to about 98% by volume of the treatment fluid, and more preferably in the range of from about 20% to about 80%. The amount of gas to incorporate into the fluid may be affected by factors including the viscosity of the fluid and wellhead pressures involved in a particular application.

The foam can optionally include a particulate, such as a proppant, or other components.

A well fluid according to this embodiment can be introduced into the well at a rate and pressure and directed to a subterranean formation at a rate and pressure that is at least sufficient to create at least one fracture in the subterranean formation of the well.

The well fluid can be, for example, a drilling fluid, a cementing composition, a fluid-loss control pill, an acidizing fluid, a viscous-sweep fluid, a fracturing fluid, a frac-packing fluid, a gravel-packing fluid, a spacer fluid, or a fluid for swelling a swellable packer.

CONCLUSION

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

No limitations are intended to the details other than as described in the claims below.

What is claimed is:

1. A method of using a nanohybrid-stabilized foam in a well, wherein the method comprises the steps of:
   (a) forming a foam comprising:
      (i) a nanohybrid comprising a carbon nanotube attached to a hydrophilic inorganic second component;

(ii) a liquid phase, wherein the liquid phase is an oil-based liquid; and
(iii) a gaseous phase;
(b) introducing a well fluid comprising the foam into the well.

2. The method according to claim 1, wherein the nanohybrid stabilizes the liquid-gaseous interface of the foam.

3. The method according to claim 2, further comprising the step of: after the step of introducing, modifying the nanohybrid to break the foam in the well.

4. The method according to claim 1, wherein the gaseous phase is at least 5% by volume of the well fluid.

5. The method according to claim 1, wherein the liquid phase is an oil.

6. The method according to claim 1, wherein the liquid phase is a water-in-oil emulsion.

7. The method according to claim 6, wherein the nanohybrid stabilizes the water-in-oil emulsion of the foam.

8. The method according to claim 1, wherein the oil-based liquid comprises a viscosity-increasing agent.

9. The method according to claim 1, wherein the well fluid is introduced into the well at a rate and pressure and directed to a subterranean formation at a rate and pressure that is at least sufficient to create at least one fracture in the subterranean formation of the well.

10. The method according to claim 1, wherein the well fluid is a drilling fluid, a cementing composition, a fluid-loss control pill, an acidizing fluid, a viscous-sweep fluid, a fracturing fluid, a frac-packing fluid, a gravel-packing fluid, a spacer fluid, or a fluid for swelling a swellable packer.

11. The method according to claim 1, wherein the hydrophilic inorganic second component of the nanohybrid is silica.

12. The method according to claim 1, wherein the hydrophilic inorganic second component of the nanohybrid is selected from the group consisting of: alumina, magnesium oxide, and titanium oxide.

* * * * *